E. M. TURNER.
Spring Jam-Nut.

No. 126,110.  Patented April 23, 1872.

WITNESSES
B. Fallows
E. D. Taylor.

INVENTOR
E. Malcolm Turner

UNITED STATES PATENT OFFICE.

E. MALCOLM TURNER, OF ALLEGHENY, PENNSYLVANIA.

IMPROVEMENT IN SPRING-CLIP LOCK-NUTS.

Specification forming part of Letters Patent No. 126,110, dated April 23, 1872.

SPECIFICATION.

*To all whom it may concern:*

Be it known that I, E. MALCOLM TURNER, of Allegheny City, in the county of Allegheny and State of Pennyslvania, have invented certain new and useful Improvements in Spring-Clip Lock-Nuts; and I do hereby declare that the following is a full, clear, and exact description thereof, reference being had to the accompanying drawing and to the letters of reference marked thereon, which form a part of this specification.

My invention consists of an improved lock-nut, which, when applied to lock an ordinary nut springs over the sides of same and clips it, thus securing at one and the same time the nut to be fastened or held in position and the lock-nut itself in such a manner that any tendency to loosen either nut by jars or vibration is counteracted by the said clip nut.

Figure 1:
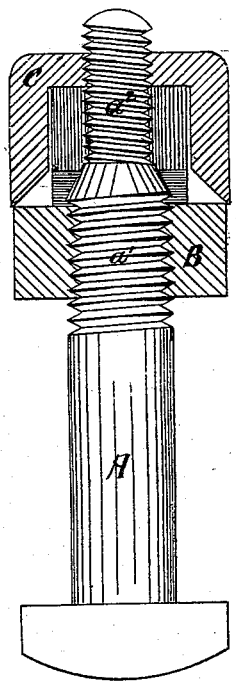
Figure 2:
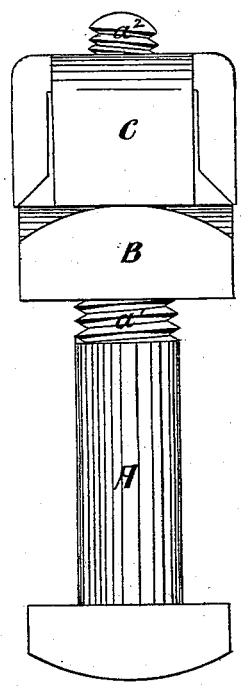
Figure 3:
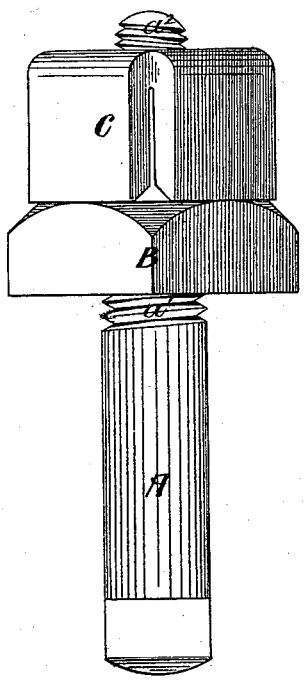
Figure 4:
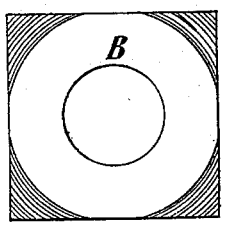
Figure 5:
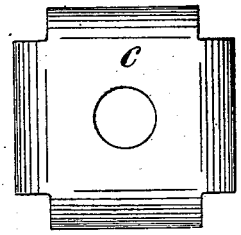
Figure 6:
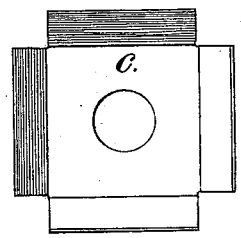
Figure 7:
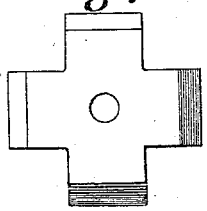

In the accompanying drawing, Figure 1 is a sectional elevation of my improved spring-clip lock-nut; Fig. 2, an elevation of same. Fig. 3 is also an elevation, showing corner view. Fig. 4 is a plan of an ordinary nut, beveled on one face, for the purpose hereafter described. Fig. 5 is a plan of my improved lock-nut; Fig. 6, an inverted plan of same. Fig. 7 is a plan of a piece of metal from which the nut is formed.

Scale, full size, excepting Fig. 7, which is half-size.

In the accompanying drawing, my improved lock-nut C is shown applied to a bolt, with right-and-left handed threads $a^1$ and $a^2$, of different diameters and pitches; but I wish it distinctly understood that it is equally applicable to bolts having only one thread, or to bolts with like threads of different pitches and diameters. B is an ordinary nut with its outer face slightly beveled to receive the lock-nut C.

My improved lock-nut is manufactured in the following manner: A plate of metal is cut to the shape shown in Fig. 7 of the accompanying drawing. The four sides having been first slightly beveled at their extremities, are bent over until square or thereabout with the face, as shown in Figs. 1, 2, and 3, of the accompanying drawing. It is then ready for use.

I do not confine myself to this specific form of clip nut, as it might be found advantageous to use one or more sides.

It will be seen that the nut C is formed so that when screwed up the parts of it which come in contact with nut B to be locked spring over the sides thereof, the beveled parts resting on the flat sides of said nut B, thus clipping and locking both independently of friction between them, and at the same time by pressing out the spring pieces of nut C, jams its thread into the thread of bolt A; but it will also act as a spring-clip nut, although not screwed up square with the ordinary nut B. In this case the friction between the surfaces in contact is depended upon to prevent its being loosened.

It will be seen by reference to Figs. 1, 2, and 3, of the accompanying drawing that the said clip nut C is shown just in contact with nut B, but not screwed up in position.

The internal space in nut C is sufficiently large to freely admit the thread $a^1$ of bolt A, thus allowing the nut C to be screwed up when said thread $a^1$ projects beyond the face of said nut B.

Having thus described my invention, what I claim as new, and desire to secure by Letters Patent, is—

1. The spring-clip lock-nut C, constructed substantially as described, and for the purpose set forth.

2. The combination of nut C, ordinary nut B, and bolt A, substantially in the manner and for the purpose set forth and described.

In testimony that I claim the foregoing as my own I affix my signature in presence of two witnesses.

E. MALCOLM TURNER.

Witnesses:
BENJ. FALLOWS,
R. MUNSON PURCELL.